United States Patent
Motojima et al.

(10) Patent No.: US 11,194,508 B2
(45) Date of Patent: Dec. 7, 2021

(54) REMOTE INPUT/OUTPUT SYSTEM

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Daichi Motojima, Shinagawa (JP); Motohiko Okabe, Fuchu (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/977,118

(22) PCT Filed: Oct. 15, 2019

(86) PCT No.: PCT/JP2019/040383
§ 371 (c)(1),
(2) Date: Sep. 1, 2020

(87) PCT Pub. No.: WO2020/166131
PCT Pub. Date: Aug. 20, 2020

(65) Prior Publication Data
US 2020/0409593 A1    Dec. 31, 2020

(30) Foreign Application Priority Data

Feb. 12, 2019    (JP) .............................. JP2019-022830

(51) Int. Cl.
*G06F 3/06*    (2006.01)
*G06F 13/12*    (2006.01)

(52) U.S. Cl.
CPC ............ *G06F 3/0656* (2013.01); *G06F 3/061* (2013.01); *G06F 3/067* (2013.01); *G06F 3/0658* (2013.01); *G06F 13/122* (2013.01)

(58) Field of Classification Search
None
See application file for complete search history.

(56) References Cited

U.S. PATENT DOCUMENTS 9,805,194 B2 * 10/2017 LeMay ............... G06F 12/0802
2013/0219158 A1 * 8/2013 Martelli .............. G06F 9/44505
713/1

FOREIGN PATENT DOCUMENTS

JP    2007-226445 A    9/2007

OTHER PUBLICATIONS

International Search Report dated Jan. 7, 2020 in PCT/JP2019/040383 filed Oct. 15, 2019.

* cited by examiner

*Primary Examiner* — Brian R Peugh
(74) *Attorney, Agent, or Firm* — Oblon, McClelland, Maier & Neustadt, L.L.P.

(57) ABSTRACT

A remote I/O system includes an information network control module, I/O interface modules, and a remote I/O module. The information network control module includes a common memory and a second control IC. The second control IC includes a variation detecting circuit that includes a data latch buffer that stores read data from an information network; and a variation detection memory that stores data previously read from the information network. The variation detecting circuit compares data stored in the data latch buffer with data stored in the variation detection memory, to detect a variation in the data. The second control IC transmits, to the I/O interface module, by cyclic scan transmission, data (Continued)

from one of the scan memory areas corresponding to the data having the variation detected by the variation detecting circuit.

4 Claims, 7 Drawing Sheets

REMOTE INPUT/OUTPUT SYSTEM

CROSS-REFERENCE TO RELATED APPLICATIONS

This application is a national stage application of International Application No. PCT/JP2019/040383, filed Oct. 15, 2019, which designates the United States, and which claims the benefit of priority from Japanese Patent Application No. 2019-022830, filed Feb. 12, 2019, the entire contents of each of which are incorporated herein by reference.

FIELD

Embodiments described herein relate generally to a remote input/output (I/O) system.

BACKGROUND input/output (I/O) modules are electronic devices that are connected to a master device, such as a controller and a personal computer (PC), to input and output data to and from peripheral devices such as motors or sensors, in factories adopting process automation (PA) or factory automation (FA), for example. Among I/O modules, remote I/O modules serve to exchange data with a master device through a communication network. Such remote I/O modules enable reduction in operational load on a central processing unit (CPU) module incorporated in the master device and reduction in amount of wiring for use in input/output communications. Also, part of the remote I/O modules connected by way of a communication network can be updated.

Along with growing demand for a high-capacity data transfer system capable of transferring high-capacity data, I/O modules and remote I/O modules are requested to heighten their data transfer speed.

An exemplary configuration of a remote I/O system including a remote I/O module is now described. In the remote I/O system, an information network control module is connected to a communication network and data is transferred therefrom to the remote I/O module through an I/O interface module. The information network control module includes a common memory having scan memory areas and transmits data to the I/O interface module from a scan memory area designated by a CPU module. The I/O interface module receives the data from the information network control module and transmits it to the remote I/O module. Likewise, the remote I/O module transfers data to the information network control module through the I/O interface module in the same manner.

In such a remote I/O system, to transmit data from the information network control module to the I/O interface module, the CPU module designates a scan memory areas storing transmit data to the remote I/O module, among the scan memory areas of the common memory of the information network control module (hereinafter referred to as CPU processing). For this reason, it constantly takes a longer amount of time for data transfer between the information network control module and the I/O interface module than between the I/O interface module and the remote I/O module.

To perform batch input/output processing for implementing concurrent data transfer between the information network control module and the I/O interface module and between the I/O interface module and the remote I/O module, total data transfer time between the information network control module and the remote I/O module depends on the data transfer time between the information network control module and the I/O interface module. This may cause an undesirable waiting time in the data transfer between the I/O interface module and the remote I/O module.

DETAILED DESCRIPTION

According to an embodiment, in general, a remote input/output system includes an information network control module, a plurality of input/output interface modules, and a remote input/output module. The input/output interface modules each include an input/output interface memory; and a first control integrated circuit configured to receive data from the information network control module or another input/output interface module by cyclic scan transmission through a remote input/output bus, to write the data to the input/output interface memory, and to output the data from the input/output interface memory to the remote input/output module. The information network control module includes a common memory including scan memory areas individually provided for the input/output interface modules; and a second control integrated circuit configured to read data from an information network, write the data to the scan memory areas, and transmit the data from the scan memory areas to the input/output interface modules by cyclic scan transmission through the remote input/output bus. The second control integrated circuit includes a variation detecting circuit including a data latch buffer that stores the data read from the information network; and a variation detection memory that stores data previously read from the information network. The variation detecting circuit compares the data stored in the data latch buffer with the data stored in the variation detection memory, to detect a variation in the data. The second control integrated circuit transmits data from one of the scan memory areas to the input/output interface modules by cyclic scan transmission, the data corresponding to the data having the variation detected by the variation detecting circuit.

A remote I/O system according to one embodiment will be described below with reference to the accompanying drawings.

Figure 1:
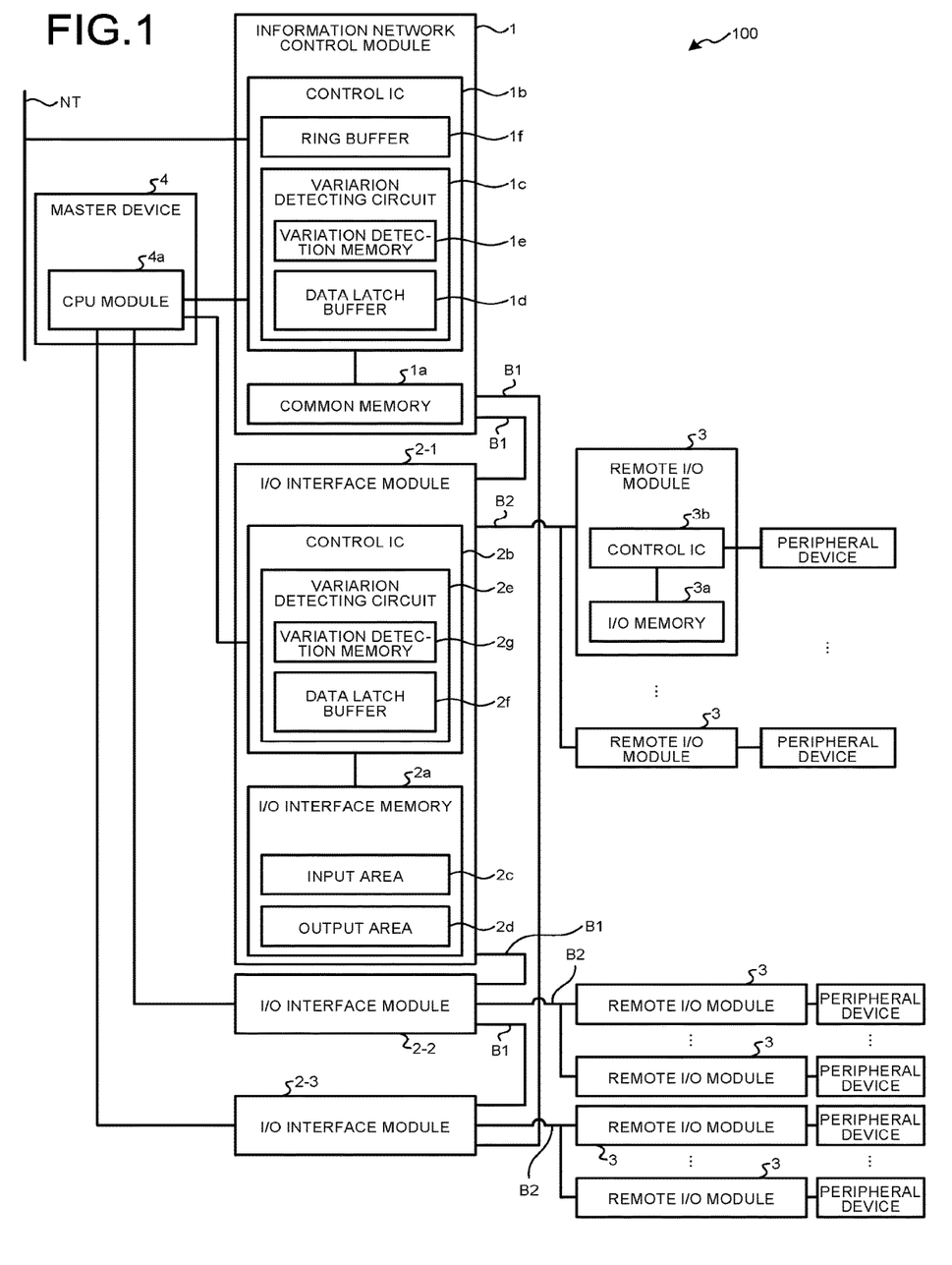
FIG. 1 is a diagram illustrating an exemplary configuration of a remote I/O system according to an embodiment.

FIG. 1 is a diagram illustrating an exemplary configuration of a remote I/O system according to an embodiment. A remote I/O system 100 of an embodiment includes an information network control module 1, three I/O interface modules 2-1 to 2-3, and a plurality of remote I/O modules 3, as illustrated in FIG. 1.

Hereinafter, the I/O interface modules 2-1 to 2-N are referred to as I/O interface module or modules 2 unless otherwise distinguished from one another. The present embodiment describes the remote I/O system 100 including three I/O interface modules 2-1 to 2-3 by way of example. However, the remote I/O system 100 is not limited to such an example as long as it includes two or more I/O interface modules 2.

The information network control module 1 is connected to an information network NT, such as an intranet in a plant, and to a CPU module 4a incorporated in a master device 4, such as a controller and a PC. The information network control module 1 and the I/O interface modules 2 are connected to each other through a remote I/O bus B1 for cyclic scan transmission through the remote I/O bus B1. The I/O interface modules 2 and the corresponding remote I/O modules 3 are connected to each other through a remote I/O bus B2.

Each remote I/O module 3 includes an I/O memory 3a and a control integrated circuit (IC) 3b. The I/O memory 3a stores input data from the I/O interface modules 2 and from a peripheral device, such as a motor or a sensor. The control IC 3b receives data from the I/O interface modules 2 through the I/O bus B2 and writes the data to the I/O memory 3a. The control IC 3b then transmits the data (data received from the I/O interface module 2) from the I/O memory 3a to the peripheral device. The control IC 3b also receives data from the peripheral device and writes the data to the I/O memory 3a. The control IC 3b transmits the data (input data from the peripheral device) from the I/O memory 3a to the I/O interface module 2.

Each I/O interface module 2 includes an I/O interface memory 2a and a control IC 2b. The I/O interface memory 2a contains an input area 2c and an output area 2d. The input area 2c serves as a storage area that stores input data from the remote I/O modules 3. The output area 2d serves as a storage area that stores output data to the remote I/O module 3.

The control IC 2b receive data from the remote I/O modules 3 and writes the data to the input area 2c, and transmits the data from the input area 2c to the other I/O interface modules 2 and the information network control module 1 by cyclic scan transmission. The control IC 2b also receives data from the information network control module 1 or the other I/O interface modules 2 by cyclic scan transmission, writes the data to the output area 2d, and outputs the data from the output area 2d to the remote I/O modules 3.

The information network control module 1 includes a common memory 1a and a control IC 1b. The common memory 1a includes a plurality of scan memory areas. Herein, the scan memory areas are provided individually for the I/O interface modules 2, and serve to store therein data to be transmitted to and received from the I/O interface modules 2 by cyclic scan transmission through the remote I/O bus B1.

Figure 2:
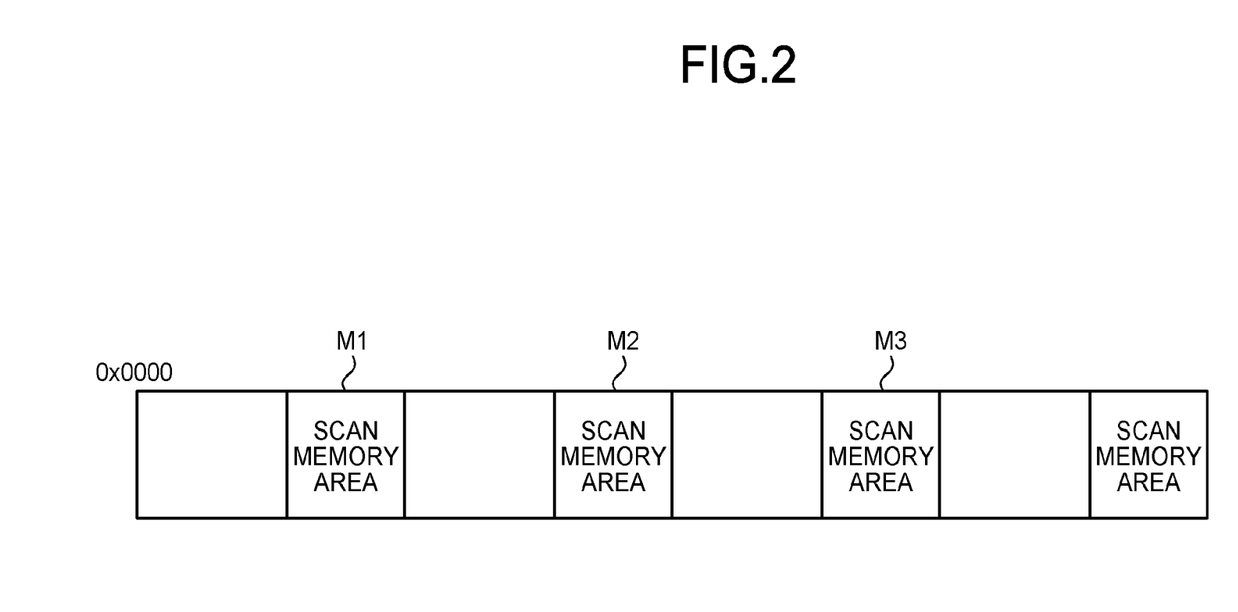
FIG. 2 is a diagram illustrating a memory map of a common memory of an information network control module of the remote I/O system according to the embodiment.

FIG. 2 is a diagram illustrating a memory map of the common memory in the information network control module of the remote I/O system according to the embodiment. As illustrated in FIG. 2, the common memory 1a includes a scan memory area M1 for the I/O interface module 2-1, a scan memory area M2 for the I/O interface module 2-2, and a scan memory area M3 for the I/O interface module 2-3.

Referring back to FIG. 1, the control IC 1b reads data from the information network NT, writes the read data to the scan memory areas of the common memory 1a, and transmits the data from the scan memory areas to the I/O interface modules 2 by cyclic scan transmission. The control IC 1b also receives data from the I/O interface modules 2 by cyclic scan transmission. The control IC 1b then writes the received data to the scan memory area corresponding to the I/O interface module 2 having transmitted the received data, among the scan memory areas of the common memory 1a.

In the conventional remote I/O system 100, the information network control module 1 transmits, by cyclic scan transmission, to the I/O interface modules 2, data from the scan memory area designated by the CPU module 4a incorporated in the master device 4, among the scan memory areas of the common memory 1a. That is, in the remote I/O system 100, data is transmitted from the information network control module 1 to the I/O interface modules 2 through the CPU module 4a's processing for designating a scan memory area (hereinafter referred to as CPU processing). Because of this, it constantly takes a longer length of data transfer time between the information network control module 1 and the I/O interface modules 2 than between the I/O interface modules 2 and the remote I/O modules 3.

Thus, to perform batch input/output processing for implementing concurrent data transfer between the information network control module 1 and the I/O interface modules 2 and between the I/O interface modules 2 and the remote I/O modules 3, the total data transfer time between the information network control module 1 and the remote I/O modules 3 depends on the data transfer time between the information network control module 1 and the I/O interface modules 2. This creates an undesirable waiting time in the data transfer between the I/O interface modules 2 and the remote I/O modules 3.

In view of this, according to the present embodiment the information network control module 1 transmits data to the I/O interface modules 2 without the CPU processing. Specifically, the control IC 1b of the information network control module 1 includes a variation detecting circuit 1c. The variation detecting circuit 1c includes a data latch buffer 1d and a variation detection memory 1e. The data latch buffer 1d serves to store data read from the information network NT. The variation detection memory 1e serves to store data previously read from the information network NT (hereinafter referred to as a previous value).

The variation detecting circuit 1c writes, to the data latch buffer 1d, the read data from the information network NT. The variation detecting circuit 1c then compares the data stored in the data latch buffer 1d with the previous value stored in the variation detection memory 1e. Thereby, the variation detecting circuit 1c detects a variation in the data stored in the data latch buffer 1d.

In the present embodiment, after receipt of an instruction for execution of cyclic scan transmission from the external CPU module 4a, the variation detecting circuit 1c compares the data stored in the data latch buffer 1d with the data stored in the variation detection memory 1e in a preset cycle to detect a variation in the data stored in the data latch buffer 1d.

Among the scan memory areas of the common memory 1a, the control IC 1b transmits, by cyclic scan transmission, to the I/O interface modules 2, data from the scan memory area corresponding to the data having the variation detected by the variation detecting circuit 1c. As for the scan memory areas of the common memory 1a storing scan data corresponding to the data having no variation detected by the detecting circuit 1c, the control IC 1b refrains from data transmission therefrom to the I/O interface modules 2.

In this manner, the information network control module 1 can transmit data to the I/O interface modules 2 by cyclic scan transmission without the CPU processing. This eliminates the necessity for waiting for the CPU processing by the CPU module 4a of the master device 4, shortening the time taken for data transmission from the information network control module 1 to the I/O interface modules 2. This can contribute to heightening data transfer speed in the remote I/O system 100.

Moreover, in performing batch input/output processing for implementing concurrent data transfer between the information network control module 1 and the I/O interface modules 2 and between the I/O interface modules 2 and the remote I/O modules 3, the total data transfer time between the information network control module 1 and the remote I/O modules 3 less depends on the data transfer time between the information network control module 1 and the I/O interface modules 2. This can shorten an undesirable waiting time in the data transfer between the I/O interface modules 2 and the remote I/O modules 3.

In response to no stored data in the variation detection memory 1e, the variation detecting circuit 1c executes an initial update process to write the read data from the information network NT to the variation detection memory 1e. In reading data from the information network NT next after the initial update process, the variation detecting circuit 1c compares the data stored in the data latch buffer 1d with the data stored in the variation detection memory 1e, to detect a variation in the data.

In the present embodiment, the control IC 1b includes a ring buffer 1f, as illustrated in FIG. 1. The ring buffer 1f stores therein the read data from the information network NT. Before execution of the initial update process, the control IC 1b transmits the data from the ring buffer 1f to the I/O interface modules 2 by cyclic scan transmission.

In the present embodiment, the control IC 2b of each I/O interface module 2 includes a variation detecting circuit 2e as with the control IC 1b of the information network control module 1, as illustrated in FIG. 1. The variation detecting circuit 2e includes a data latch buffer 2f and a variation detection memory 2g. The data latch buffer 2f serves to store input data from the remote I/O module 3. The variation detection memory 2g serves to store data previously input from the remote I/O module 3 (hereinafter referred to as a previous value).

The variation detecting circuit 2e writes input data from the remote I/O module 3 to the data latch buffer 2f. The variation detecting circuit 2e then compares the data stored in the data latch buffer 2f with the previous value stored in the variation detection memory 2g. In this manner, the variation detecting circuit 2e detects a variation in the data stored in the data latch buffer 2f. In the present embodiment, the variation detecting circuit 2e detects a variation in the data stored in the data latch buffer 2f in a preset cycle by comparing the data stored in the data latch buffer 2f with the data stored in the variation detection memory 2g.

In response to detection of a variation in the data stored in the input area 2c, the control IC 2b transmits the data in question to the information network control module 1 and the other I/O interface modules 2 by cyclic scan transmission. In the case of no detection of a variation in the data stored in the input area 2c, the control IC 2b refrains from transmitting the data to the information network control module 1 and the other I/O interface modules 2 by cyclic scan transmission.

Thus, while the data stored in the input area 2c exhibits no variation, the I/O interface module 2 performs no data transfer to the information network control module 1, therefore, the information network control module 1 and the I/O interface module 2 can reduce loads for the data transfer therebetween.

Figure 3:
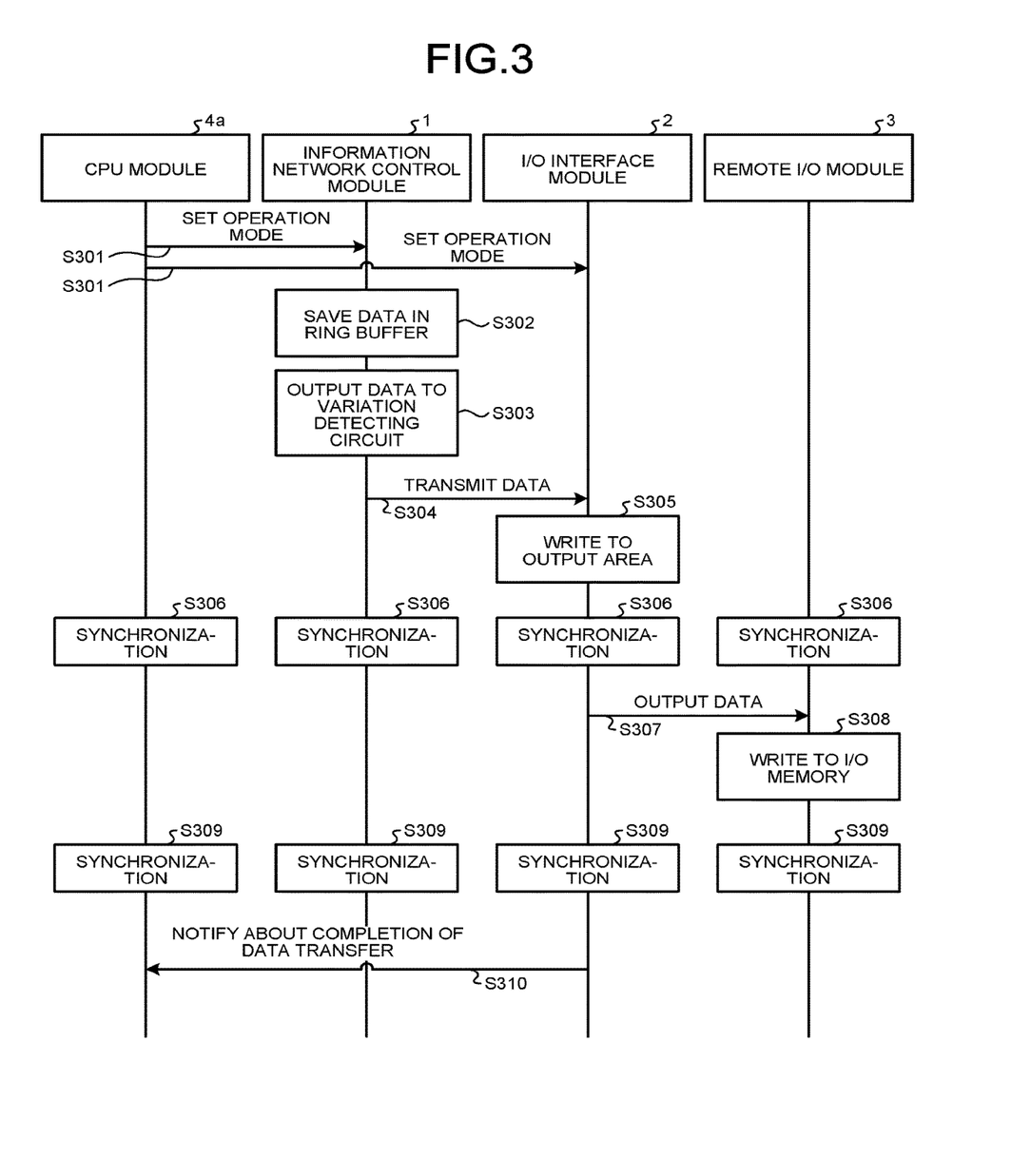
FIG. 3 is a diagram for illustrating an exemplary flow of data transmission from the information network control module to a remote I/O module in the remote I/O system of the embodiment.

The following will describe a flow of data transmission from the information network control module 1 to the remote I/O module 3 before the initial update process with reference to FIG. 3, by way of example. FIG. 3 is a diagram for illustrating an exemplary flow of data transmission from the information network control module to the remote I/O modules in the remote I/O system of the embodiment.

First, at the time of start of data transfer in the remote I/O system 100, the CPU module 4a mounted on the master device 4 sets the operation modes of the control IC 1b of the information network control module 1 and the control IC 2b of each I/O interface module 2 (step S301).

Herein, the operation modes are of the control ICs 1b and 2b. In the present embodiment, the operation modes include a RIO mode and a controller mode. The RIO mode refers to a mode in which the control ICs 1b and 2b operate irrespective of an instruction from the CPU module 4a of the master device 4. The controller mode refers to a mode in which the control ICs 1b and 2b operate in accordance with an instruction from the CPU module 4a of the master device 4.

The CPU module 4a mounted on the master device 4 transmits an address map of the common memory 1a of the information network control module 1 to the information network control module 1 and the I/O interface modules 2. The address map represents the memory addresses of the scan memory areas corresponding to the I/O interface modules 2 in the common memory 1a.

After the operation modes of the control ICs 1b and 2b are set, the control IC 1b of the information network control module 1 reads data from the information network NT, and saves the read data in the ring buffer 1f (step S302). The control IC 1b outputs the data from the ring buffer 1f to the variation detecting circuit 1c while writing the data stored in the ring buffer 1f to the corresponding scan memory area of the common memory 1a in accordance with the address map (step S303). In response to data input to the ring buffer 1f before the initial update process, the variation detecting circuit 1c writes the input data to the variation detection memory 1e as a previous value.

Subsequently, the control IC 1b transmits the data from the ring buffer 1f to the I/O interface module 2 by cyclic scan transmission (step S304).

The control IC 2b of the I/O interface module 2 receives the data from the information network control module 1 and writes the data to the output area 2d (step S305). The control IC 2b of the I/O interface module 2 waits for completion of data input from the remote I/O module 3, if such a data input occurs (that is, data is input from the remote I/O module 3 the I/O interface module 2 concurrently), and establishes synchronization between the CPU module 4a of the master device 4 and the respective hardware elements (the information network control module 1, the I/O interface modules 2, and the remote I/O modules 3) (step S306).

The control IC 2b outputs the data from the output area 2d to the remote I/O module 3 (step S307).

The control IC 3b of the remote I/O module 3 receives the data from the I/O interface module 2 and writes the data to the I/O memory 3a (step S308). After completion of data output from the remote I/O module 3 to the I/O interface module 2, the control IC 3b synchronizes the CPU module 4a of the master device 4 and the respective hardware elements (the information network control module 1, the I/O interface modules 2, and the remote I/O modules 3) (step S309).

Thereafter, the control IC 2b of the I/O interface module 2 notifies the CPU module 4a of the master device 4 of completion of the data transfer from the information network control module 1 to the remote I/O module 3 (step S310).

Figure 4:
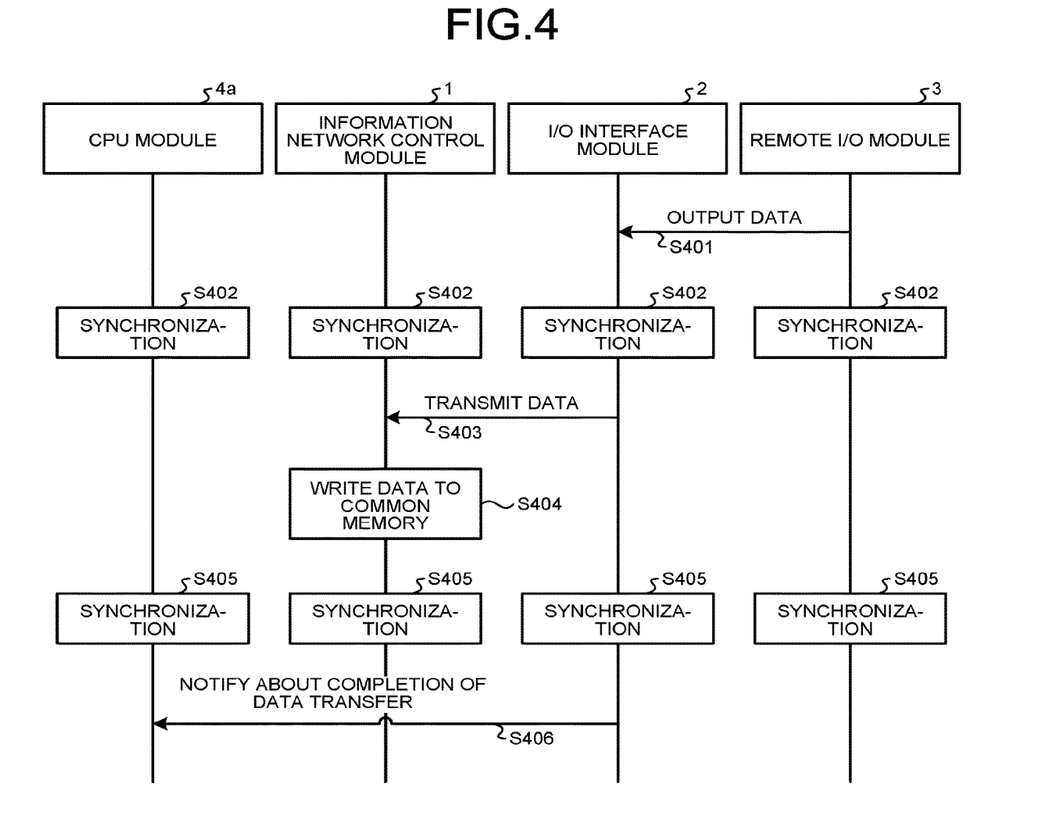
FIG. 4 is a diagram for illustrating an exemplary flow of data transmission from the remote I/O module to the information network control module in the remote I/O system of the embodiment.

The following will describe an exemplary flow of the data transmission from the remote I/O module 3 to the information network control module 1 before the initial update process with reference to FIG. 4. FIG. 4 is a diagram for illustrating a flow of the data transmission from the remote I/O module to the information network control module in the remote I/O system of the embodiment, by way of example.

The control IC 3b of the remote I/O module 3 outputs data from the I/O memory 3a to the I/O interface module 2 at preset intervals (step S401).

The control IC 2b of the I/O interface module 2 receives the data from the remote I/O module 3 and writes it to the input area 2c of the I/O interface memory 2a. The variation detecting circuit 2e of the control IC 2b writes the received data from the remote I/O module 3 to the data latch buffer 2f and the variation detection memory 2g.

The control IC 2b of the I/O interface module 2 waits for completion of data transmission from the information network control module 1 to the I/O interface module 2, if such a transmission occurs (that is, data is transmitted from the information network control module 1 to the I/O interface module 2 concurrently), and synchronizes the CPU module 4a of the master device 4 and the respective hardware elements (the information network control module 1, the I/O interface modules 2, and the remote I/O modules 3) (step S402).

The control IC 2b of the I/O interface module 2 then transmits the data from the input area 2c to the information network control module 1 and the other I/O interface modules 2 by cyclic scan transmission (step S403).

The control IC 1b of the information network control module 1 receives the data from the I/O interface module 2 and writes, with reference to the address map, the data to the scan memory area corresponding to the I/O interface module 2 having transmitted the received data in question, among the scan memory areas of the common memory 1a (step S404). After completion of the data transmission from the I/O interface module 2 to the information network control module 1, the control IC 1b of the information network control module 1 synchronizes the CPU module 4a of the master device 4 and the respective hardware elements (the information network control module 1, the I/O interface modules 2, and the remote I/O modules 3) (step S405).

The control IC 2b of the I/O interface module 2 then notifies the CPU module 4a of the master device 4 of completion of the data transfer from the I/O interface module 2 to the information network control module 1 (step S406).

Figure 5:
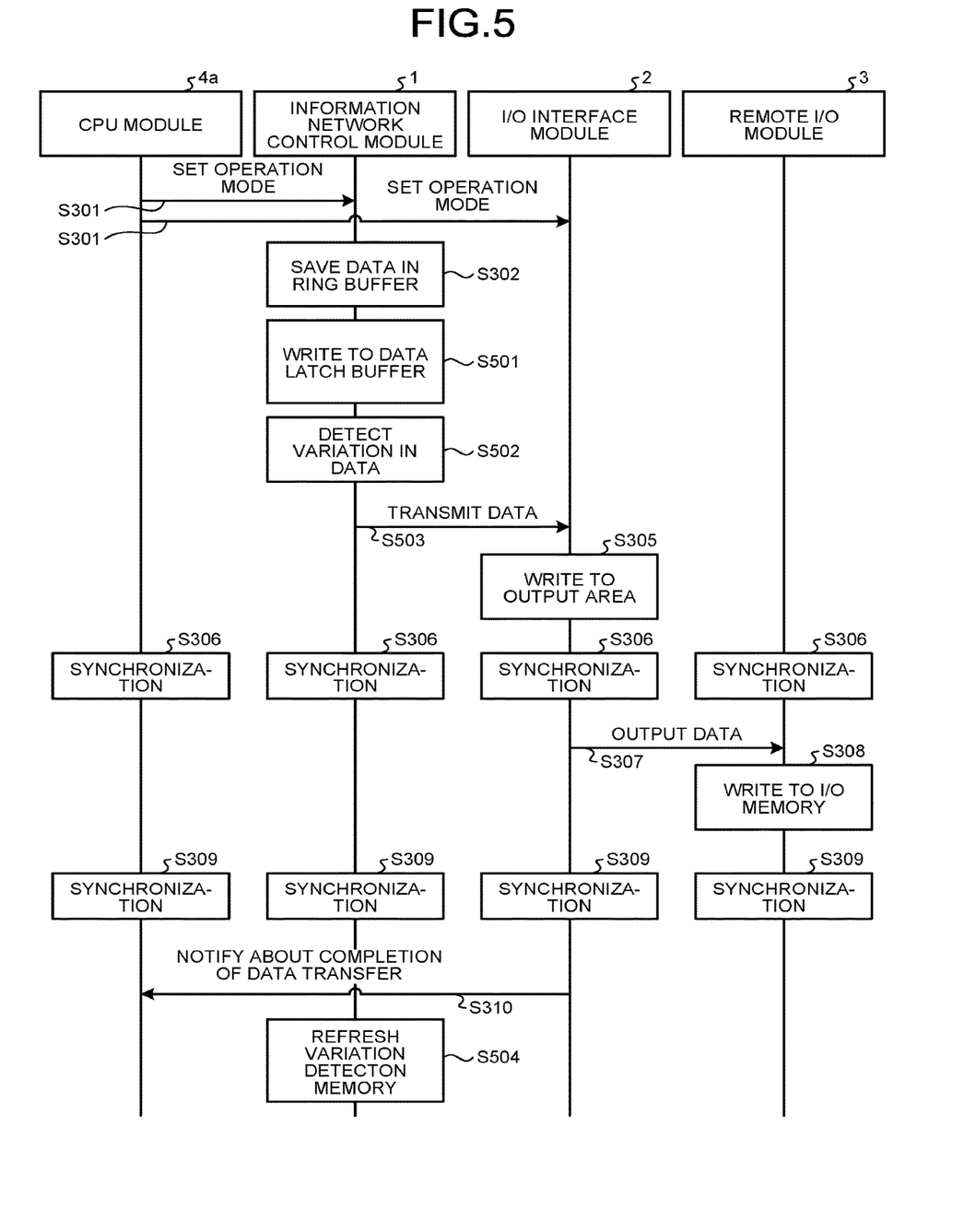
FIG. 5 is a diagram for illustrating an exemplary flow of data transmission from the information network control module to the remote I/O module in the remote I/O system of the embodiment.

The following will describe an exemplary flow of the data transmission from the information network control module 1 to the remote I/O module 3 after the initial update process with reference to FIG. 5. FIG. 5 is a diagram for illustrating the flow of the data transmission from the information network control module to the remote I/O module in the remote I/O system of the present embodiment, by way of example. The following process is different from the data transmission from the information network control module 1 to the remote I/O module 3 as illustrated in FIG. 3.

After the operation modes of the control ICs 1b and 2b are set, the control IC 1b of the information network control module 1 reads and saves data from the information network NT in the ring buffer 1f (step S302). The control IC 1b writes the data stored in the ring buffer 1f to the corresponding scan memory area of the common memory 1a with reference to the address map. The variation detecting circuit 1c writes the data stored in the ring buffer 1f to the data latch buffer 1d (step S501). The variation detecting circuit 1c compares the data stored in the data latch buffer 2f with the data stored in the variation detection memory 1e in a preset cycle, to detect a variation in the data stored in the data latch buffer 1d (step S502).

In response to detection of a variation in the data stored in the data latch buffer 1d, the control IC 1b transmits, by cyclic scan transmission, to the I/O interface modules 2, the data stored in the scan memory area corresponding to the data having the variation detected, among the scan memory areas of the common memory 1a (step S503).

After completion of the data transfer from the information network control module 1 to the remote I/O module 3, the control IC 2b of the I/O interface module 2 notifies the CPU module 4a of the master device 4 of the completion of the data transfer from the information network control module 1 to the remote I/O module 3 (step 310). The variation detecting circuit 1c performs a refresh operation to the data stored in the variation detection memory 1e by read-back (step S504).

Figure 6:
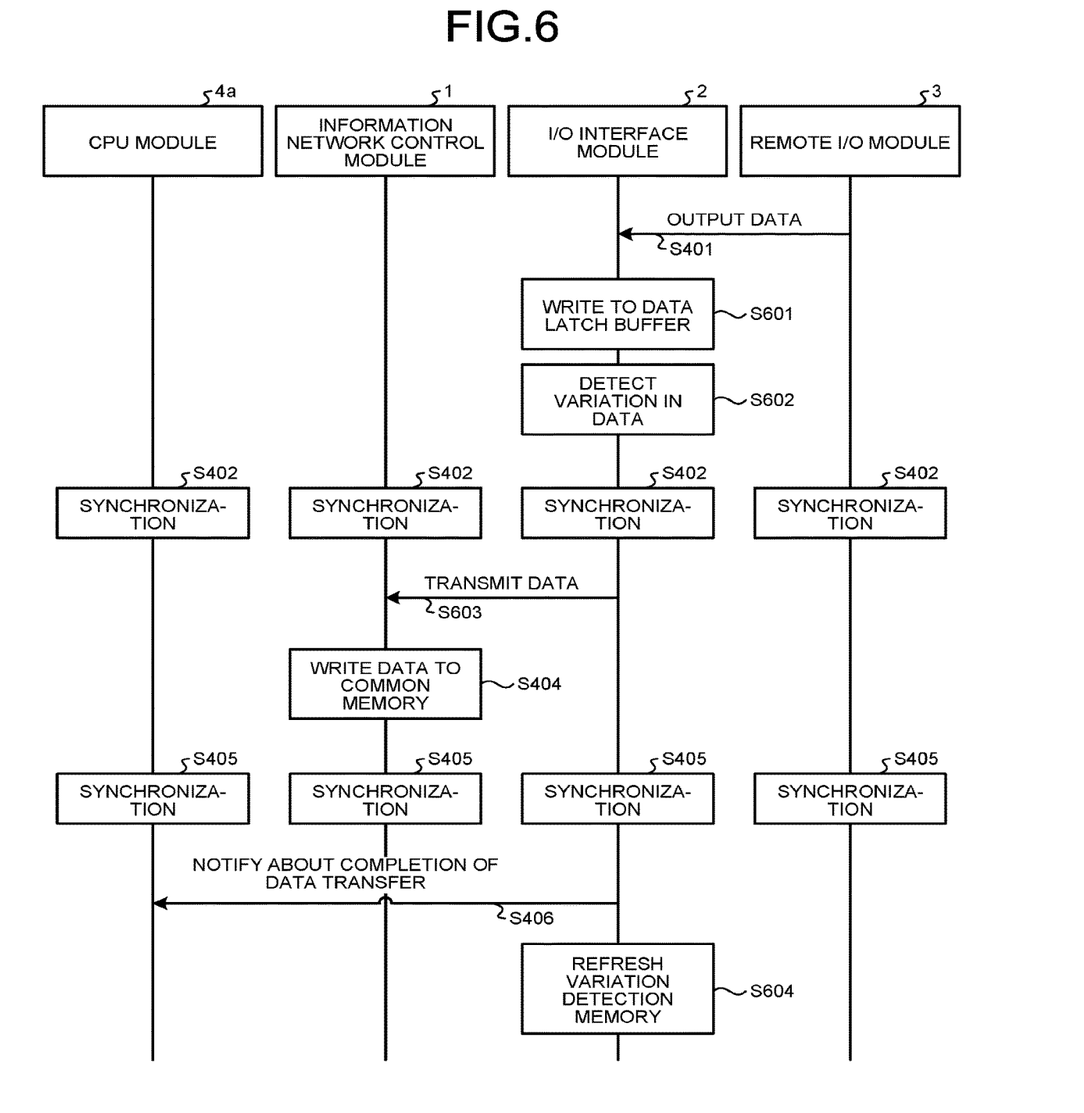
FIG. 6 is a diagram for illustrating an exemplary flow of data transmission from the remote I/O module to the information network control module in the remote I/O system of the embodiment.

The following will describe an exemplary flow of the data transmission from the remote I/O module 3 to the information network control module 1 after the initial update process with reference to FIG. 6. FIG. 6 is a diagram for illustrating the flow of the data transmission from the remote I/O module to the information network control module in the remote I/O system of the present embodiment, by way of example. The following process is different from the data transmission from the remote I/O module 3 to the information network control module 1 as illustrated in FIG. 4.

The variation detecting circuit 2e of the control IC 2b of the I/O interface module 2 receives data from the remote I/O module 3 and writes the data to the data latch buffer 2f (step S601). The variation detecting circuit 2e then compares the data stored in the data latch buffer 2f with the data stored in the variation detection memory 2g, to detect a variation in the data stored in the data latch buffer 2f (step S602).

In response to detection of a variation in the data stored in the data latch buffer 2f, the control IC 2b transmits the data from the input area 2c to the information network control module 1 and the other I/O interface modules 2 by cyclic scan transmission (step S603) after completion of the data transmission from the information network control module 1 to the I/O interface modules 2 and synchronization established between the CPU module 4a of the master device 4 and the respective hardware elements (the information network control module 1, the I/O interface modules 2, the remote I/O modules 3) (step S402). The variation detecting circuit 2e updates the data stored in the variation detection memory 2g with the data stored in the data latch buffer 2f.

In the case of no detection of a variation in the data stored in the data latch buffer 2f, the control IC 2b does not transmit the data from the input area 2c to the information network control module 1 and the other I/O interface modules 2 by cyclic scan transmission.

After the remote I/O module 3 completes the data transfer to the information network control module 1 and the control IC 2b of the I/O interface module 2 notifies the CPU module 4a of the master device 4 of the completion of the data transfer, the variation detecting circuit 2e performs a refresh operation to the data stored in the variation detection memory 2g by read-back (step S604).

Figure 7:
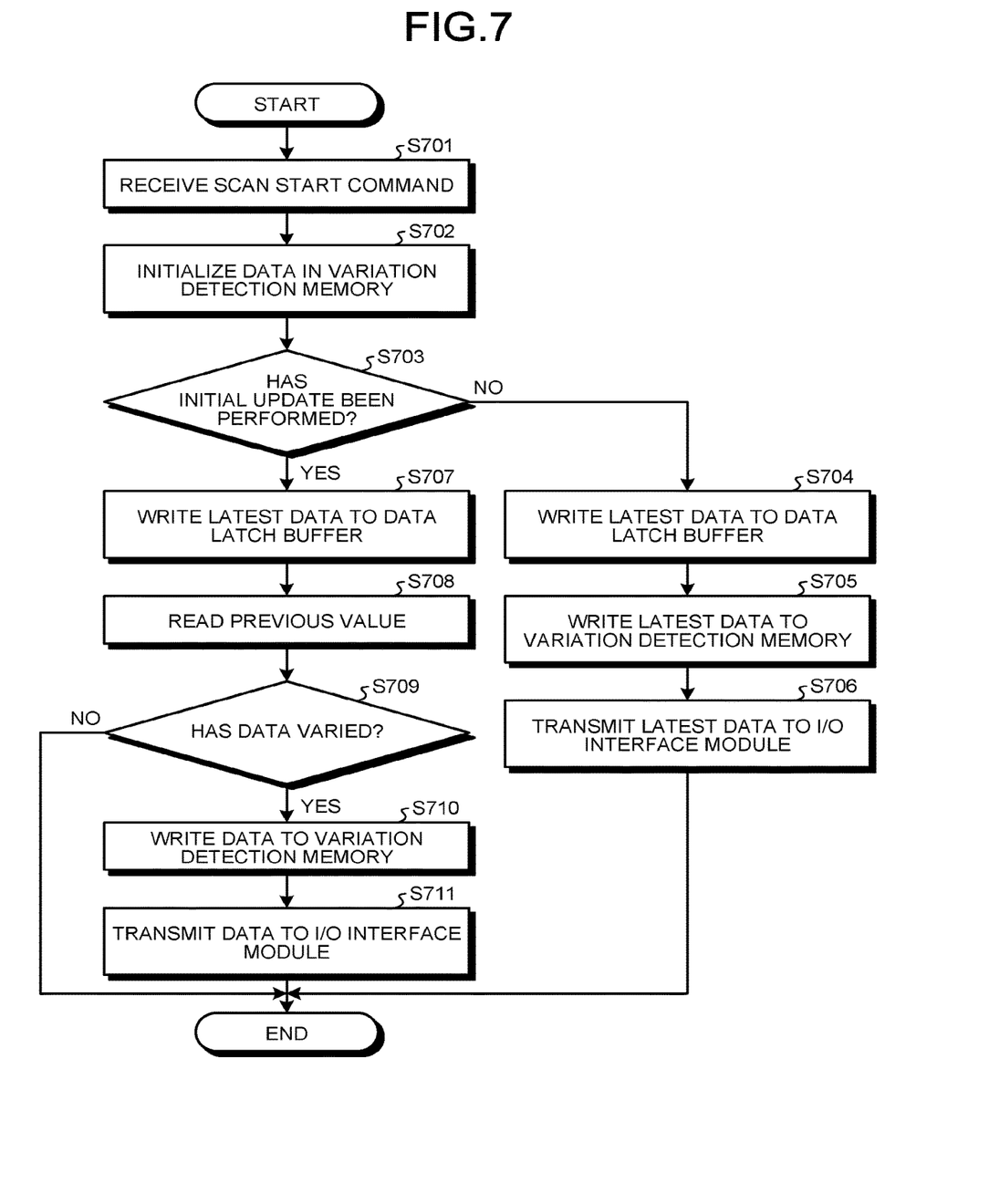
FIG. 7 is a flowchart illustrating an exemplary data transmission to an I/O interface module from the information network control module of the remote I/O system of the embodiment.

The following will describe an exemplary flow of data transmission from the information network control module 1 to the I/O interface module 2 with reference to FIG. 7. FIG. 7 is a flowchart illustrating an exemplary flow of data transmission from the information network control module to the I/O interface module in the remote I/O system of the present embodiment.

After receiving, from the CPU module 4a of the master device 4a, a scan start command for starting cyclic scan transmission between the information network control module and the I/O interface modules 2 (step S701), the variation detecting circuit 1c initializes the data stored in the variation detection memory 1e (step S702). The control IC 1b then reads data from the information network NT and writes the read data to the ring buffer 1f. The variation detecting circuit 1c determines whether the initial update process has been executed (step S703).

After determining no execution of the initial update process (No at step S703), the variation detecting circuit 1c writes latest data stored in the ring buffer 1f to the data latch buffer 1d (step S704) and writes the same to the variation detection memory 1e as a previous value (step S705). The control IC 1b transmits the latest data from the ring buffer 1f to the I/O interface modules by cyclic scan transmission (step S706).

After determining the initial update process as executed (Yes at step S703), the variation detecting circuit 1c writes the latest data stored in the ring buffer if to the data latch buffer 1d (step S707). The variation detecting circuit 1c reads a previous value from the variation detection memory 1e (step S708). The variation detecting circuit 1c then compares the data stored in the data latch buffer 1d with the previous value read from the variation detection memory 1e, to detect a variation in the data stored in the data latch buffer 1d (step S709).

After detecting a variation in the data stored in the data latch buffer 1d (Yes at step S709), the variation detecting circuit 1c writes the latest data stored in the data latch buffer 1d to the variation detection memory 1e as a previous value (step S710). The control IC 1b transmits, by cyclic scan transmission, to the I/O interface modules 2, the data stored in the scan memory area corresponding to the data having the variation detected, among the scan memory areas of the common memory 1a (step S711).

After detecting no variation in the data stored in the data latch buffer 1d (No at step S709), the control IC 1b ends the data transmission from the information network control module 1 to the I/O interface modules 2 without updating the data stored in the variation detection memory 1e or transmitting the read data from the information network NT to the I/O interface modules 2.

As described above, the remote I/O system according to the present embodiment enables data transmission from the information network control module 1 to the I/O interface modules 2 by cyclic scan transmission without the CPU processing. This results in eliminating the necessity for waiting for the CPU processing by the CPU module 4a of the master device 4, shortening the time taken for data transmission from the information network control module 1 to the I/O interface modules 2. Higher-speed data transfer in the remote I/O system 100 can be thus implemented.

While certain embodiments have been described, these embodiments have been presented by way of example only, and are not intended to limit the scope of the invention. Indeed, these novel embodiments described herein may be embodied in a variety of other forms; furthermore, various omissions, substitutions and changes may be made without departing from the spirit of the invention. The accompanying claims and their equivalents are intended to cover such embodiments and the modifications thereof as would fall within the scope and spirit of the invention.

The invention claimed is:

1. A remote input/output system comprising:
an information network control module;
a plurality of input/output interface modules; and
a remote input/output module, wherein
the input/output interface modules each comprise:
an input/output interface memory; and
a first control integrated circuit configured to receive data from the information network control module or another I/O interface module by cyclic scan transmission through a remote input/output bus, write the data to the input/output interface memory, and output the data from the input/output interface memory to the remote input/output module,
the information network control module comprises:
a common memory including scan memory areas individually provided for the input/output interface modules; and
a second control integrated circuit configured to read data from an information network, write the data to the scan memory areas, and transmit the data from the scan memory areas to the I/O interface modules by cyclic scan transmission through the remote I/O bus,
the second control integrated circuit comprises a variation detecting circuit including:
a data latch buffer that stores the data read from the information network; and
a variation detection memory that stores data previously read from the information network,
the variation detecting circuit compares the data stored in the data latch buffer with the data stored in the variation detection memory, to detect a variation in the data, and
the second control integrated circuit transmits data from one of the scan memory areas to the input/output interface modules by cyclic scan transmission, the data corresponding to the data having the variation detected by the variation detecting circuit.

2. The remote input/output system according to claim 1, wherein
in response to no stored data in the variation detection memory, the variation detecting circuit executes an initial update process to write the read data from the information network to the variation detection memory, and
in reading data from the information network next after the initial update process, the variation detecting circuit compares the data stored in the data latch buffer with the data stored in the variation detection memory, to detect a variation in the data.

3. The remote input/output system according to claim 2, wherein the second control integrated circuit comprises a ring buffer that stores the data read from the information network, and before execution of the initial update process, the second control integrated circuit transmits the data from the ring buffer to the input/output interface modules by cyclic scan transmission.

4. The remote input/output system according to claim 1, wherein after receipt of an instruction for execution of cyclic scan transmission from an external CPU module, the variation detecting circuit compares the data stored in the data latch buffer with the data stored in the variation detection memory in a preset cycle, to detect a variation in the data.

* * * * *